(12) United States Patent
Yamabe

(10) Patent No.: US 10,543,760 B2
(45) Date of Patent: Jan. 28, 2020

(54) VEHICLE SEAT

(71) Applicant: TS TECH CO., LTD., Saitama (JP)

(72) Inventor: Atsushi Yamabe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 65 days.

(21) Appl. No.: 15/776,854

(22) PCT Filed: Nov. 8, 2016

(86) PCT No.: PCT/JP2016/083105
§ 371 (c)(1),
(2) Date: May 17, 2018

(87) PCT Pub. No.: WO2017/086211
PCT Pub. Date: May 26, 2017

(65) Prior Publication Data
US 2018/0334060 A1 Nov. 22, 2018

(30) Foreign Application Priority Data

Nov. 20, 2015 (JP) .................................. 2015-228202

(51) Int. Cl.
| | |
|---|---|
| *B60N 2/42* | (2006.01) |
| *B60N 2/427* | (2006.01) |
| *B60N 2/68* | (2006.01) |
| *B60N 2/22* | (2006.01) |
| *B60N 2/20* | (2006.01) |

(52) U.S. Cl.
CPC ........... *B60N 2/42709* (2013.01); *B60N 2/20* (2013.01); *B60N 2/22* (2013.01); *B60N 2/68* (2013.01)

(58) Field of Classification Search
CPC .... B60N 2/42709; B60N 2/4228; B60N 2/68; B60N 2/42745; B60N 2/888; B60N 2/427
USPC ........................................ 297/216.12–216.16
See application file for complete search history.

(56) References Cited

U.S. PATENT DOCUMENTS

| | | | |
|---|---|---|---|
| 6,024,406 A | 2/2000 | Charras et al. | |
| 8,544,948 B2 * | 10/2013 | Nitsuma ............ | B60N 2/42709 297/216.13 |
| 10,144,325 B2 * | 12/2018 | Akaike .................. | B60N 2/682 |

(Continued)

FOREIGN PATENT DOCUMENTS

| | | |
|---|---|---|
| CN | 102198814 | 1/2013 |
| EP | 0888926 | 1/1999 |

(Continued)

OTHER PUBLICATIONS

European Search Report for PCT/JP2016/083105, dated Jun. 17, 2019, 9 pages.

(Continued)

*Primary Examiner* — Shin H Kim
(74) *Attorney, Agent, or Firm* — Dority & Manning, P.A.

(57) ABSTRACT

In a vehicle seat, a movable frame tiltably connected to a seat back is provided with an impact absorbing property. The vehicle seat comprises a seat back frame, and a movable frame connected to the seat back frame via a reclining mechanism so as to be tiltable around a laterally extending rotational axial line and to correspond to an upper back portion of an occupant, the movable frame being provided with a first weakened portion configured to be a starting point of deformation when an external load exceeding a prescribed value is applied to the movable frame.

11 Claims, 10 Drawing Sheets

(56) References Cited

U.S. PATENT DOCUMENTS

| | | | |
|---|---|---|---|
| 2010/0013279 A1 | 1/2010 | Cailleteau | |
| 2010/0181812 A1* | 7/2010 | Nitsuma | B60N 2/4228 297/216.13 |
| 2011/0278886 A1* | 11/2011 | Nitsuma | B60N 2/4228 297/216.13 |
| 2012/0242124 A1* | 9/2012 | Tanabe | B60N 2/36 297/216.14 |
| 2013/0119723 A1* | 5/2013 | Nitsuma | B60N 2/4228 297/216.13 |
| 2013/0119724 A1* | 5/2013 | Adachi | B60N 2/4228 297/216.14 |
| 2015/0203000 A1 | 7/2015 | Fujita et al. | |
| 2015/0352982 A1 | 12/2015 | Watanabe | |

FOREIGN PATENT DOCUMENTS

| | | |
|---|---|---|
| EP | 2127941 | 12/2009 |
| EP | 2894060 | 7/2015 |
| JP | S60248446 | 12/1985 |
| JP | H0535859 | 9/1993 |
| JP | 2009034323 | 2/2009 |
| JP | 2012091565 | 5/2012 |
| JP | 2014129007 | 7/2014 |

OTHER PUBLICATIONS

International Search Report for PCT/JP2016/083105 dated Jan. 6, 2017, 4 pages.

* cited by examiner

VEHICLE SEAT

CROSS REFERENCE TO RELATED APPLICATIONS

This application is the U.S. National Stage entry of International Application Number PCT/JP20161083105 filed under the Patent Cooperation Treaty having a filing date of Nov. 8, 2016, which claims priority to Japanese Patent Application Number 2015-228202 having a filing date of Nov. 20, 2015, which are incorporated herein by reference.

TECHNICAL FIELD

The present invention relates to a vehicle seat to be mounted on a land vehicle or the like.

BACKGROUND ART

A conventionally known vehicle seat comprises a seat back frame, a movable frame provided in an upper part of the seat back frame so as to correspond to the upper back portion of the occupant and to be tillable with respect to the seat back frame, and a seat back pad supported by the seat back frame and the movable frame (see Patent Document 1, for instance). In the vehicle seat disclosed in Patent Document 1, the seat back frame is connected to a seat cushion frame in an angularly adjustable manner via a reclining mechanism, and the movable frame is connected to the seat back frame also in an angularly adjustable manner via a reclining mechanism. Further, a headrest is connected to the movable frame.

PRIOR ART DOCUMENT(S)

Patent Document(s)

Patent Document 1: JP2014-129007A

SUMMARY OF THE INVENTION

Task to be Accomplished by the Invention

In a vehicle seat having such a movable frame, in case of a vehicle crash, the occupant seated on the seat or the occupant seated in the seat behind the seat in question may collide with the upper part of the seat back supported by the movable frame, and the headrest connected to the movable frame. Therefore it is preferable that the movable frame is provided with a function to absorb impact.

In view of such a problem of the prior art, an object of the present invention is to provide an impact absorbing function to a movable frame tiltably connected to a seat back of a vehicle seat.

Means for Accomplishing the Task

To achieve such an object, the present invention provides a vehicle seat (5), comprising: a seat back frame (F2); and a movable frame (F3) provided at a position corresponding to an upper back portion of an occupant and having a pivot support portion (63A) connected to the seat back frame via a reclining mechanism (67) so as to be tiltable around a laterally extending rotational axial line, wherein the movable frame is provided with a first weakened portion (77) configured to be a starting point of deformation when an external load exceeding a prescribed value is applied to the movable frame.

Thereby, when an external load is applied to the movable frame, the movable frame can be deformed in a reliable manner with the first weakened portion acting as a starting point.

In this invention, preferably, the movable frame is provided with a headrest mounting portion (75) for mounting a headrest (S3) thereto, and the first weakened portion is provided between the headrest mounting portion and the pivot support portion.

Thereby, when an external load is applied to the headrest, the movable frame can bend in a reliable manner with the first weakened portion acting as a starting point ti of deformation.

In this invention, preferably, the movable frame includes a pair of side frames (60) tiltably connected to the seat back frame, and an upper frame (61) extending between upper parts of the respective side frames, the side frames being made of plate members and the first weakened portion including a notch formed in a front edge of each side frame.

Thereby, when an external load is applied to the movable frame from the rear, the movable frame bends forward so that the impact can be favorably absorbed.

In this invention, preferably, each side frame includes a side portion (62A) having a laterally facing major plane and extending vertically, and a flange (62C) projecting from a front edge of the side portion, the notch extending from a free end of the flange to a part of the side portion.

The stiffness of the side frame is enhanced by the presence of the flange on the one hand, and the first weakened portion is formed by extending the notch from the flange to the side portion on the other hand so that the difference in stiffness between the first weakened portion of the side frame and the remaining part of the side frame can be maximized. As a result, the movable frame can be bent in a reliable manner with the notch acting as a starting point of deformation.

In this invention, preferably, each side frame includes a side portion (62A) having a laterally facing major plane and extending vertically, and a reinforcing wall (62E) extending from a rear edge of the side portion and connected to a part of the upper frame, the first weakened portion being positioned so as to vertically align with the reinforcing wall, and the reinforcing wall being provided with a second weakened portion (78) positioned so as to vertically align with the first weakened portion.

In this arrangement, the stiffness of the connecting part between the side frame and the upper frame is enhanced by the reinforcing wall. Further, since the reinforcing wall has the second weakened portion at a position corresponding to the first weakened portion in the vertical direction, the side frame can be deformed starting from the first weakened portion without being obstructed by the reinforcing wall.

In this invention, preferably, the second weakened portion extends from a lower edge of the reinforcing wall upward beyond the first weakened portion with respect to a vertical direction.

Since the second weakened portion is provided over a wide range corresponding to the first weakened portion, the deformation of the movable frame starting from the first weakened portion can be caused in a reliable manner without being obstructed by the reinforcing wall.

In this invention, preferably, the reinforcing wall is provided with a harness support portion (62F) configured to support a wire harness.

Thereby, the oscillation of the wire harness disposed on the upper part of the seat back is suppressed in a favorable manner.

In this invention, preferably, the movable frame is provided with a connecting member (65) extending between lengthwise intermediate parts of the respective side frames, and the first weakened portion is provided above the connecting member.

The connecting member increases: the stiffness of the lower part of the side frame, in particular the part of the seat back frame connected to the side frame. Further, since the stiffness of the first weakened portion is reduced as compared to that of the lower part of the side frame, the deformation that could be caused by an external load can be initiated with the first weakened portion acting as a starting point in an even more reliable manner.

In this invention, preferably, the movable frame is provided with a pad support members (81) having one end connected to a part of one of the side frames located above the first weakened portion thereof, and another end connected to a part of the side frame located below the first weakened portion thereof, the pad support member being provided with at least one bent portion.

Since the pad support members are each provided with the bent portion, when the side frame deforms from the first weakened portion acting as a starting point, the pad support member is deformed at the bent portion so as not to hinder the deformation of the side frame.

In this invention, preferably, the reclining mechanism includes a first member connected to the seat back frame, a second member connected to the movable frame, a drive shaft (67A) provided between the first member and the second member, and configured to selectively connect and disconnect the first member and the second member to and from each other via an angular movement thereof, an extension shaft (70) engaged to the drive shaft so as to coaxially and integrally rotate with the drive shaft, and extending laterally outward from the seat back frame, and an operation lever (71) engaged to a free end of the extension shaft so as to integrally rotate with the extension shaft.

Thereby, the extension shaft connects the operation lever disposed on the outside of the seat back frame with the drive shaft of the reclining mechanism disposed is inside the seat back so that the manual operation is facilitated by the presence of the operation lever.

In this invention, preferably, the operation lever is provided with a receiving hole (71A) configured to receive the free end of the extension shaft, and an outer circumference of the free end of the extension shaft and an inner circumference of the receiving hole are engaged with each other by serration structures (70B and 71B).

Thereby, a firm connection structure can be formed between the operation lever and the extension shaft so that the rotation of the operation lever can be transmitted to the extension shaft in a reliable manner.

Effect of the Invention

According to the structure of a vehicle seat discussed above, a movable frame tiltably connected to a seat back is provided with an impact absorbing capability.

BRIEF DESCRIPTION OF THE DRAWING(S)

DESCRIPTION OF THE PREFERRED EMBODIMENT(S)

A preferred embodiment of the present invention as applied to an automotive rear seat (such as a second row seat and a third row seat) is described in the following with reference to the appended drawings. In the following description, the right and left are defined from the view point of an occupant seated in the seat S, and components that are provided in identical pairs on either side of the seat S may be denoted with like numerals without referring to both of each pair.

Figure 1:
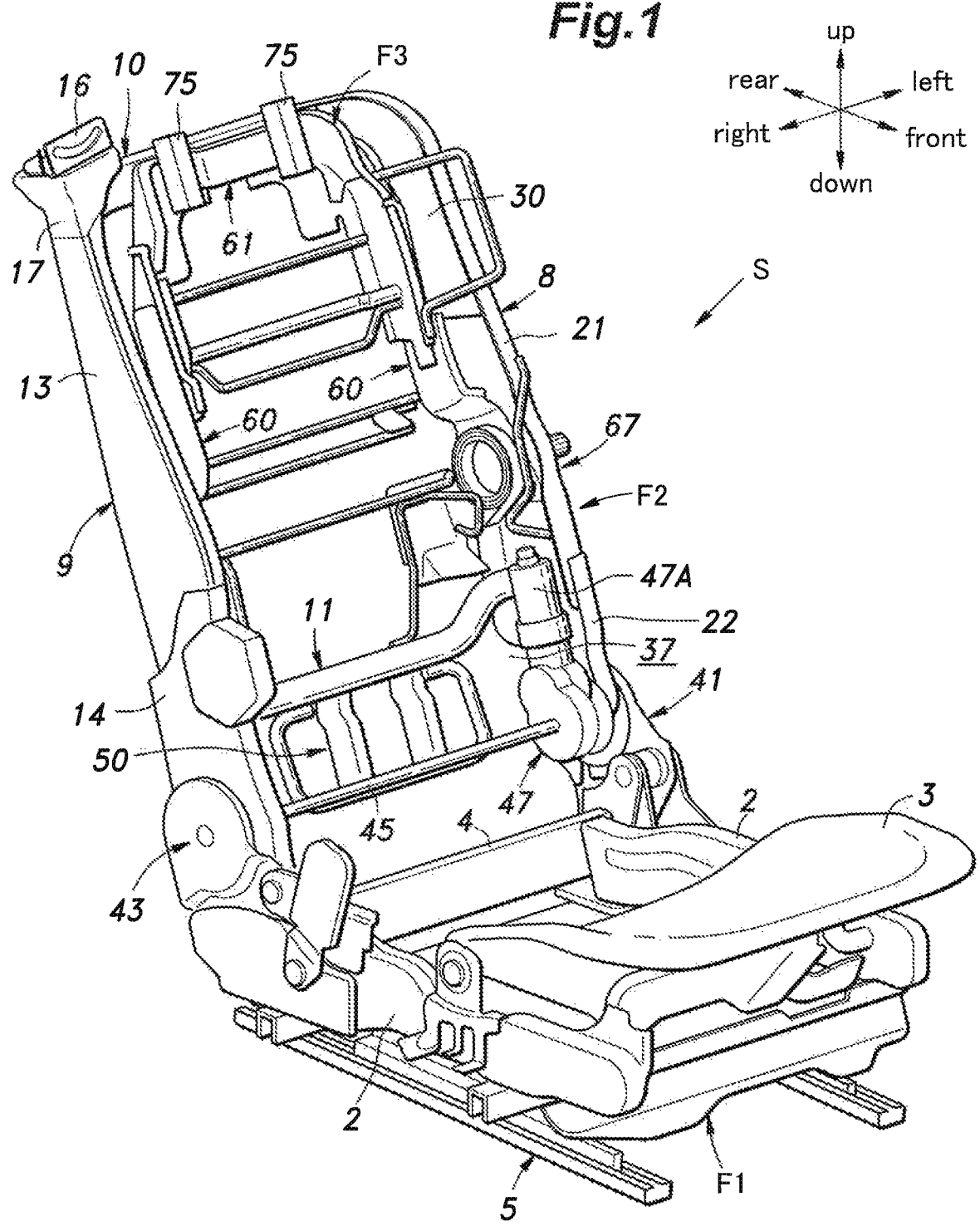
FIG. 1 is a perspective view of a frame of a seat for a land vehicle according to an embodiment of the present invention.

As shown in FIG. 1, a frame of the vehicle seat S includes a seat cushion frame F1 forming a seat cushion, a seat back frame F2 forming a seat back, and a movable frame F3 (pivotable upper seat back frame). The seat cushion is formed by covering the seat cushion frame F1 with a pad and a skin material. The seat back is formed by covering a lower part of the seat back frame F2 and the movable frame H with a pad and a skin material. The pad is made of a resilient cushion material such as polyurethane foam, and the skin material is made of synthetic leather, fabric or the like. Further, the rear side of the seat back is covered with a back board made of resin or the like.

The seat cushion frame F1 includes a pair of cushion side frames 2 extending in the fore and aft direction, a pan frame 3 made of a plate member extending between the front portions of the respective cushion side frames 2, and a rear frame 4 extending between rear parts of the respective cushion side frames 2 so as to define a generally rectangular frame structure. The seat cushion frame F1 is attached to the floor of the land vehicle via a slide device 5 which includes a pair of rails and a pair of sliders slidably supported by the respective rails. The rails preferably extend in the fore and aft direction, but may also extend in the lateral direction.

The seat back frame F2 includes a pair of back side frames 8 and 9 extending substantially vertically, a back upper frame 10 extending between upper end parts of the respective back side frames 8 and 9, and a back lower frame 11 extending between lower parts of the respective back side flames 8 and 9 so as to define a generally rectangular frame structure. The lower end parts of the back side frames 8 and 9 extend downward beyond the back lower frame 11.

Figure 2:
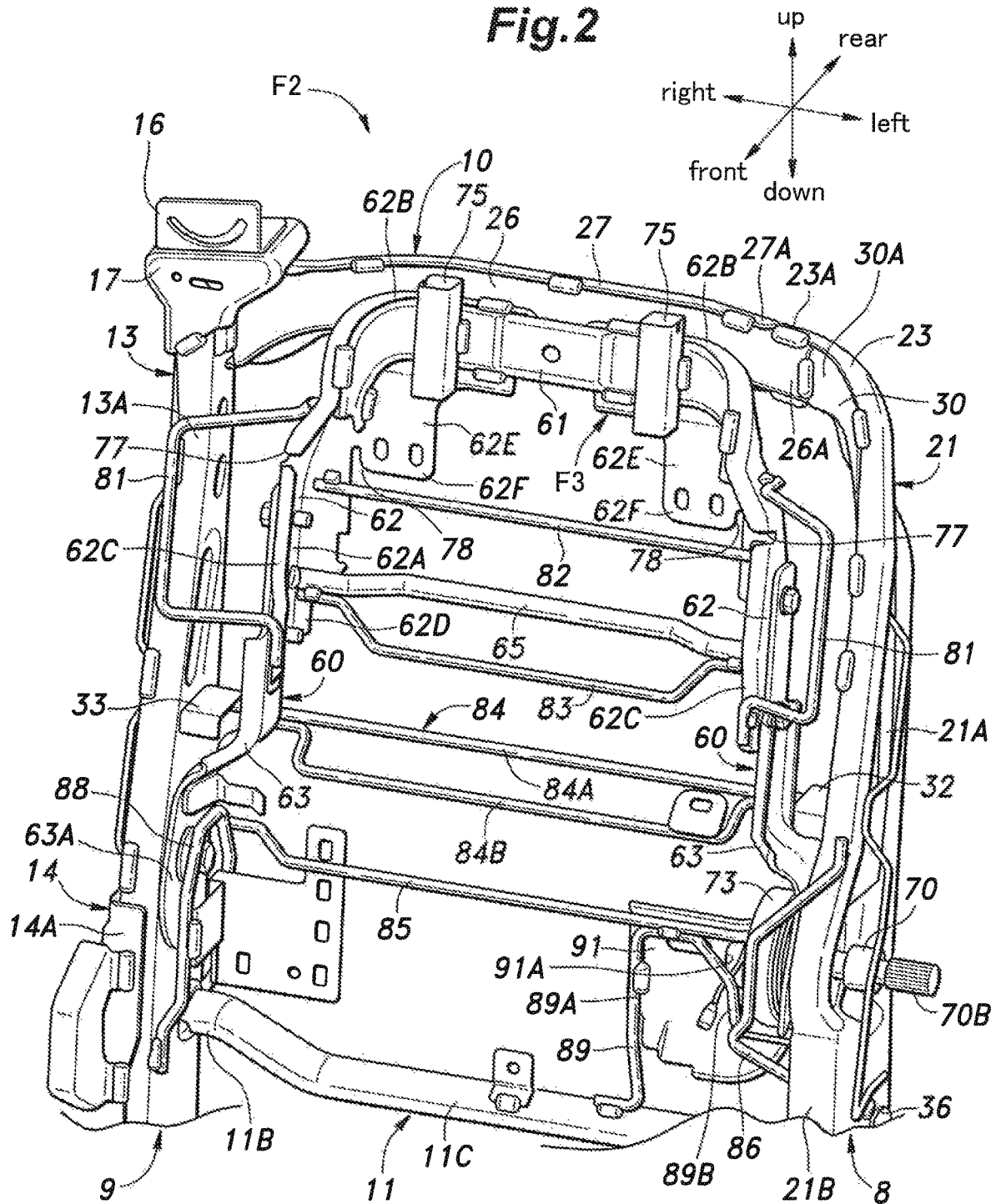
FIG. 2 is a perspective view of a seat back frame as viewed from a front left direction.
Figure 3:
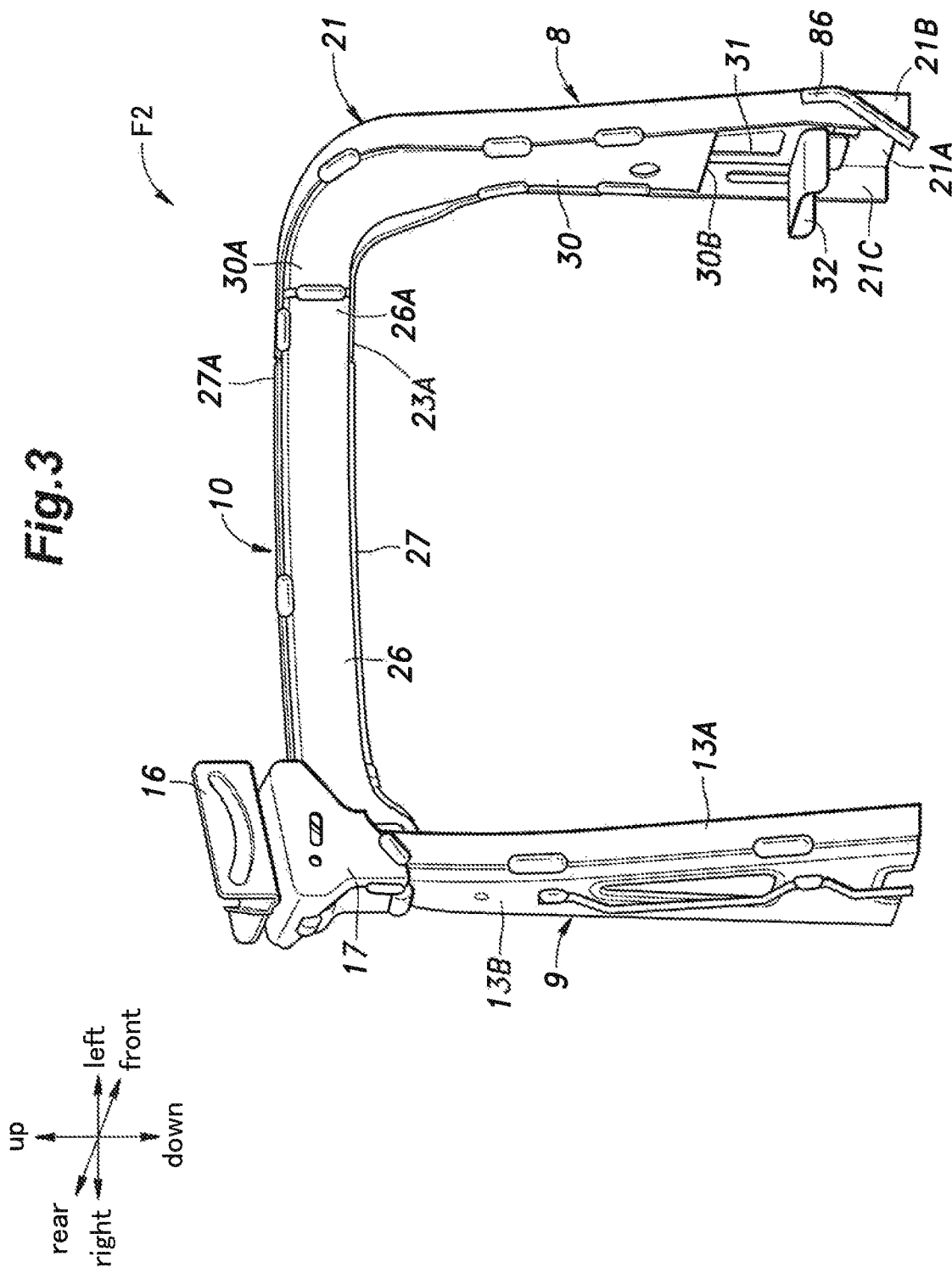
FIG. 3 is a perspective view of an upper part of the seat back frame with a movable frame omitted from illustration.

As shown in FIGS. 1 to 3, the right back side frame 9 is provided with a right upper back side frame 13 extending substantially vertically and a lower right back side frame 14 joined to a lower part of the right upper back side frame 13. The right upper back side frame 13 is composed of an inner member 13A and an outer member 13B which are both made of sheet metal members. Each of the inner member 13A and the outer member 13B has a channel shaped cross section, and the inner member 13A is disposed on the left side (the inboard side of the seat back) with respect to the outer member 13B. The inner member 13A is arranged such that the channel opening is oriented to the right while and the channel opening of the outer member 13B is oriented to the left, and the outer member 13B is fitted into the channel opening of the inner member 13A. The inner member 13A and the outer member 13B are joined to each other by welding or the like. As a result, the right upper back side frame 13 is formed with a rectangular closed cross section over the entire length thereof.

As shown in FIG. 2, the lower right back side frame 14 is made of a sheet metal member which is attached to a lower part of the outer side of the right upper back side frame 13 by welding or the like, and protrudes downward beyond the lower end of the right upper back side frame 13. The lower right back side frame 14 is provided with a major plane that faces laterally, and is formed with flanges 14A protruding to the left (inward) along the front edge, the rear edge, and the lower edge thereof, but not along the upper edge thereof. The flanges 14A are formed by bending and raising the edge portion of the lower right back side frame 14. The lower end portion of the right upper hack side frame 13 is disposed between the flanges 14A extending along the front edge and the rear edge of the lower right back side frame 14, and is in contact with these flanges 14A.

A belt guide bracket 17 for supporting a belt guide 16 for a seat belt is attached to an upper end part of the right back side frame 9. The belt guide bracket 17 is formed by combining a plurality of sheet metal members, and is attached to the upper end of the right back side frame 9 by welding or the like. The belt guide bracket 17 projects upward from the upper end of the right back side frame 9, and the belt guide 16 is attached to the upper end of the belt guide bracket 17.

The belt guide 16 consists of a member for guiding the seat belt. The belt guide 16 is formed by a sheet metal member, and has a guide hole consisting of a through hole through which the seat belt is passed. The belt guide 16 is placed on the upper end of the belt guide bracket 17 such that the guide hole faces the fore and aft direction, and is attached to the belt guide bracket 17 by a fastening means such as threaded bolts. Although not shown the drawings, a belt retractor is provided under the seat cushion frame F1 for retracting and paying out the seat belt as required. The seat belt extends rearward under the seat cushion frame F1 and thence extends upward along the rear surface of the right back side frame 9 before being pulled out forward through the belt guide 16.

As shown in FIGS. 1 to 7, the left back side frame 8 includes an upper left back side frame 21 extending substantially vertically and a lower left hack side frame 22 attached to a lower part of the upper left hack side frame 21. The upper left back side frame 21 and the lower left back side frame 22 are formed by sheet metal members. The upper left back side frame 21 has a curved portion 23 that smoothly curves rearward and rightward (toward the back upper frame 10) at its upper end part, terminating in a free end portion 23A (upper end portion) that extends rightward. A side portion 21A forming a main part of the upper left hack side frame 21 has a major plane that faces laterally, except for the curved portion 23, and this major plane transitions from the laterally facing orientation to a forward facing orientation in a continuous manner as the side portion 21A extends upward past the curved portion 23. As a result, the front edge of the side portion 21A in the lower part of the upper left back side frame 21 continuously transitions to the upper edge of the curved portion 23, and the rear edge of the side portion 21A in the lower part of the upper left back side frame 21 continuously transitions to the lower edge of the curved portion 23.

The front edge and the rear edge of the side portion 21A of the upper left hack side frame 21 are provided with flanges 21B and 21C projecting inward (to the right). The flanges 21B and 21C extend along the lengthwise direction of the upper left back side frame 21, and along the upper edge and the lower edge of the curved portion 23, and project forward. As a result, the upper left back side frame 21 is formed with a channel structure having an open cross section. The flanges 21B and 21C are formed by bending and raising the lateral edges of the side portion 21A.

Figure 6:
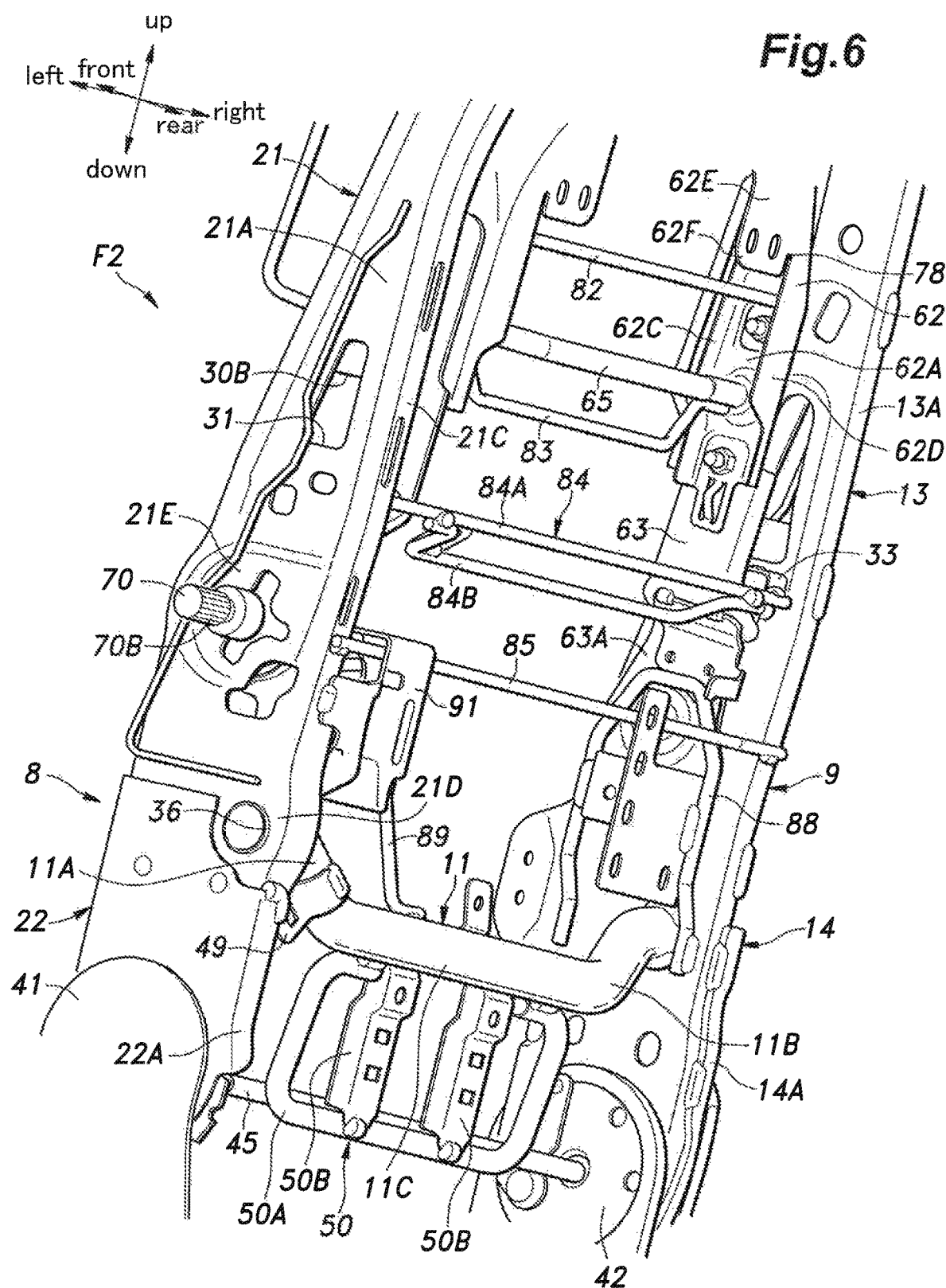
FIG. 6 is a perspective view of a lower part of the seat back frame as viewed from a rear left direction.
Figure 7:
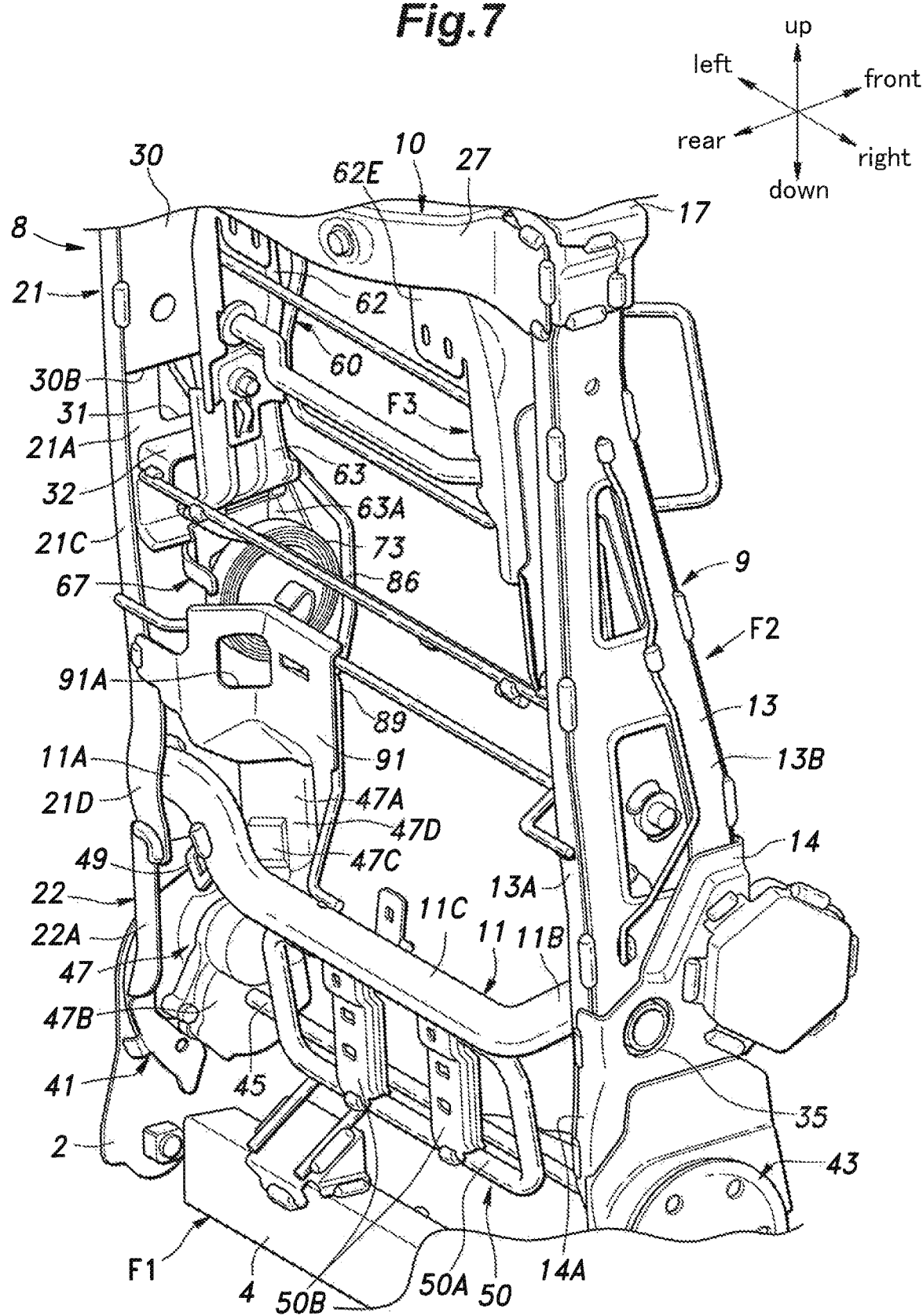
FIG. 7 is a perspective view of the lower part of the seat back frame as viewed from a rear right direction.
Figure 9:
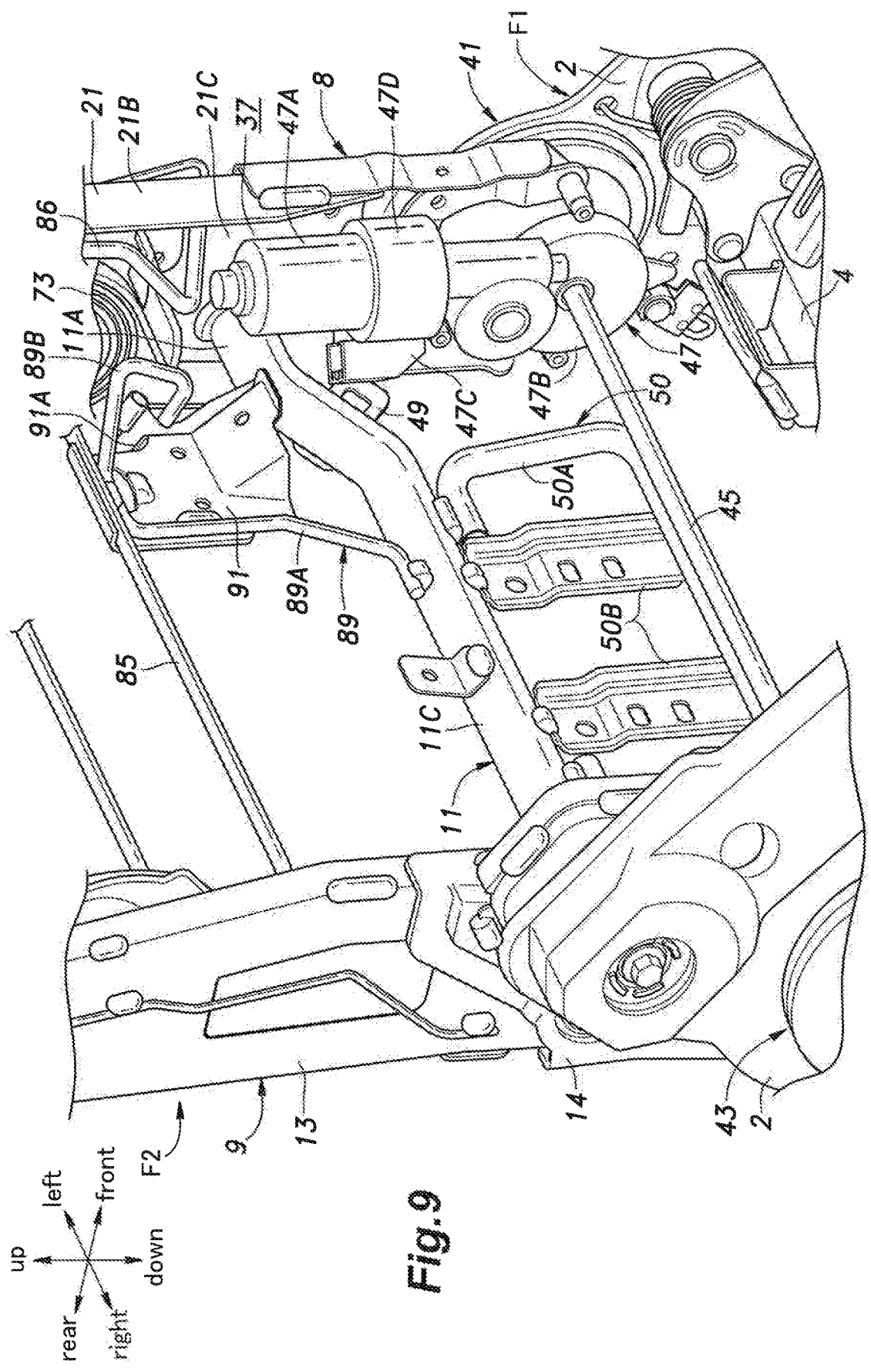
FIG. 9 is a perspective view of the lower part of the seat back frame as viewed from a front right direction.
Figure 10:
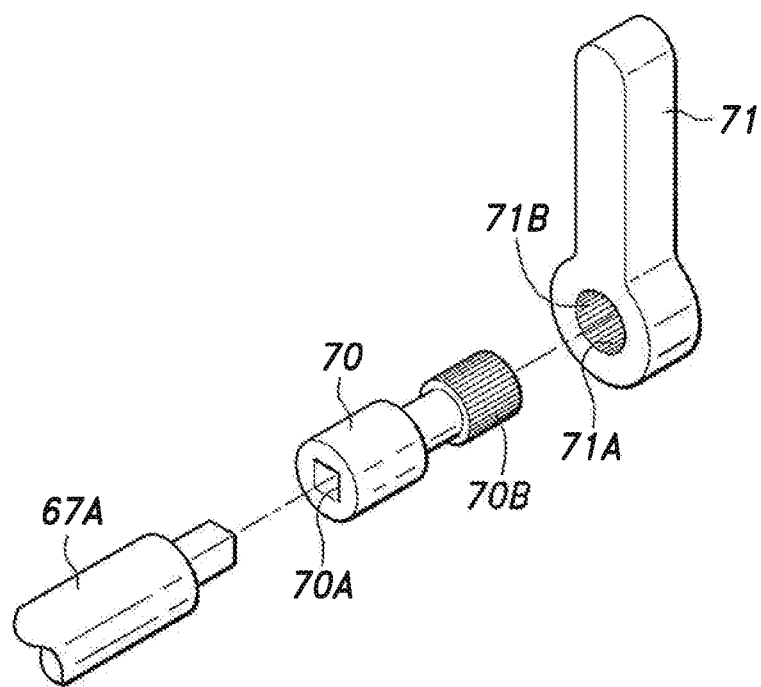
FIG. 10 is an exploded perspective view showing a connecting structure of a drive shaft, an extension shaft and an operation lever of a fourth reclining mechanism.

As shown in FIGS. 6, 7 and 9, the lower left back side frame 22 is made of a sheet metal member, and is connected to the lower outer side (left side) of the upper left back side frame 21 by welding or the like so as to extends downward beyond the lower end of the upper left back side frame 21. The lower left back side frame 22 has a laterally facing major plane, and flanges 22A protruding inward (rightward) are formed along the front edge, the rear edge, and the lower edge, except for the upper edge thereof. The flanges 22A are formed by bending and raising the edges of the lower left back side frame 22. The lower end part of the upper left back side frame 21 is disposed between the opposing parts of the flanges 22A of the lower left back side frame 22, and the front and rear faces of the flanges 21B and 21C of the upper left back side frame 21 contact the opposing parts of the flanges 22A of the lower left back side frame 22.

As shown in FIG. 3, the back upper frame 10 is composed of a front side member 26 and a rear side member 27 which consist of sheet metal members. The front side member 26 and the rear side member 27 each have a channel shaped cross section, and the front side member 26 is arranged in front of the rear side member 27. The rear side member 27 is disposed so that the channel opening thereof faces forward, and the front side member 26 has a channel opening that faces rearward and is fitted in the rear side member 27. The front side member 26 and the rear side member 27 are connected to each other by welding or the like. Thereby, the back upper frame 10 is formed as a closed cross section structure in which the cross section is substantially rectangular over the entire length thereof.

A right end of each of the front side member 26 and the rear side member 27 is connected to an upper end of the right upper back side frame 13. More specifically, the right end of the rear side member 27 is welded to the rear face of the right upper back side frame 13, and the right end part of the front side member 26 is welded to the left side face of the right upper hack side frame 13.

At the left end of the hack upper frame 10, the left end portion 26A of the front side member 26 protrudes to the left beyond the left end portion 27A of the rear side member 27. As a result, the back upper frame 10 is provided with an open cross section structure in the left end part thereof and a closed cross section structure in the remaining part thereof. The left end portion 27A of the rear side member 27 is brought into contact with, and welded to the free end portion 23A of the curved portion 23 of the left side frame 21. The left end portion 26A of the front side member 26 is received inside the channel opening of the curved portion 23 that faces forward. The flanges protruding rearward from the upper edge and the lower edge of the front side member 26 are arranged between opposing parts of the flanges extending along the upper edge and the lower edge of the curved portion 23 in close contact with each other. The front side member 26 forms a closed section structure jointly with the curved portion 23.

As shown in FIG. 3, a reinforcing member 30 is provided on the inner side of the upper half of the upper left back side frame 21. The reinforcing member 30 is formed from a sheet metal member, and has a channel shaped cross section. The reinforcing member 30 is received inside the channel of the upper left frame in such a manner that the open end of the channel of the reinforcing member 30 opposes the open end of the channel of the upper left back side frame 21. In particular, the part of the reinforcing member 30 corresponding to the curved portion 23 extends along a curved path conforming to the curved portion 23. The reinforcing member 30 includes an upper end portion 30A which abuts the left end portion 26A of the front side member 26 of the back upper frame 10 positioned in the curved portion 23, and extends from the upper end portion 30A to a vertically intermediate part of the side frame 21 after passing through the inside of the curved portion 23. The reinforcing member 30 has a major plane that faces the fore and aft direction in an upper end part thereof, and progressively changes the facing direction toward the lower end thereof until the major plane faces the lateral direction in a lower end part thereof. The flanges formed along the two side edges of the reinforcing member 30 are in contact with the inner faces of the flanges 21B and 21C of the upper left back side frame 21. The reinforcing member 30 has an upper end portion 30A that is in contact with the left end portion 26A of the front side member 26 of the back upper frame 10, and is welded to the free ends of the flanges of the upper left back side frame 21 at a plurality of locations.

The reinforcing member 30 forms a closed cross section in cooperation with the upper half part of the upper left back side frame 21 including the curved portion 23. The open (axial) end of the closed section structure formed by the reinforcing member 30 and the upper left back side frame 21 is joined to the open (axial) end of the closed cross section structure formed by the back upper frame 10 so that a continuous closed section structure is formed. More specifically, the front side member 26 and the rear side member 27 of the back upper frame 10, and the upper half of the upper left back side frame 21 and the reinforcing member 30 jointly form a closed cross section structure defining a hollow interior continuously extending over the entire length of the closed cross section structure. Thus, the part of the seat back flame F2 extending from the upper part thereof to the left side part thereof is formed by a closed section structure defining a continuously extending hollow interior.

Since the left end portion 26A of the front side member 26 of the back upper frame 10 is disposed to the left of the left end portion 27A of the rear side member 27, the connecting part between the rear side member 27 and the upper left back side frame 21, and the connecting part between the front side member 26 and the reinforcing member 30 are laterally offset from each other. As a result, the back upper frame 10 and the upper left back side frame 21 form an overlapping portion by overlapping with each other when viewed from the fore and aft direction or the vertical direction. This overlapping portion increases the stiffness of the connecting part between the upper left back side frame 21 and the back upper frame 10.

Figure 4:
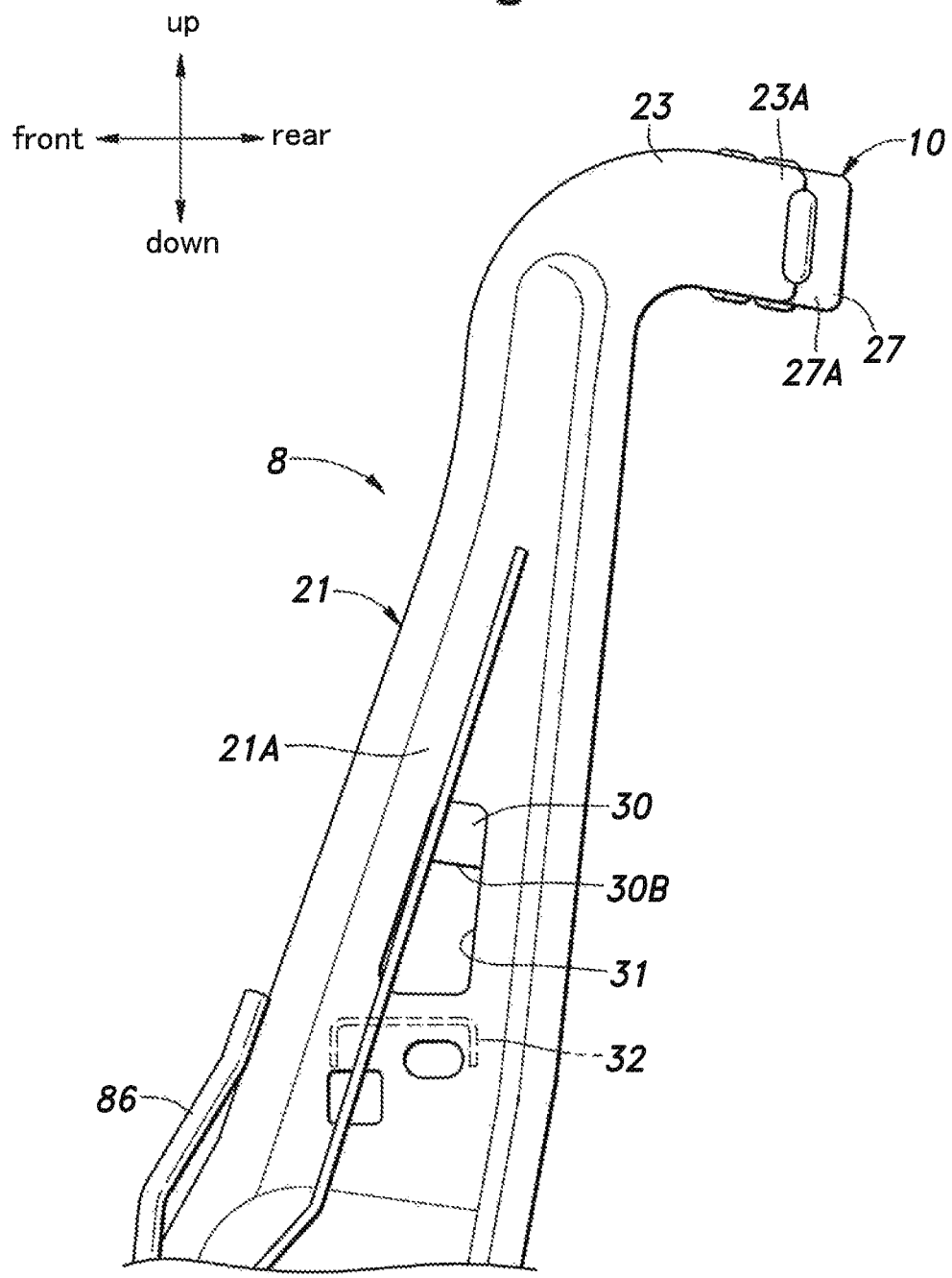
FIG. 4 is a left side view of an upper part of the seat back frame with the movable frame omitted from illustration.

As shown in FIGS. 2 and 4, the hack upper frame 10 and the curved portion 23 of the upper left back side frame 21 constitute an upper part of the seat back flame F2, and the curved portion 23 has a laterally central part that is curved as a whole so as to have a convex side facing rearward.

As shown in FIGS. 3 and 4, a part of the side portion 21A of the upper left back side frame 21 located below the curved portion 23 is formed with a positioning hole 31 that is passed laterally through the side portion 21A. The positioning hole 31 is elongated in the lengthwise direction of the upper left hack side frame 21. A positioning pin of the manufacturing apparatus is inserted into the positioning hole 31 at the time of manufacturing the seat S for the purpose of placing the upper left hack side frame 21 at a prescribed position. A lower edge 30B of the reinforcing member 30 is disposed at a position overlapping with the positioning hole 31 in side view. More specifically, the lower edge 30B of the reinforcing member 30 is disposed so as to correspond to an intermediate part of the positioning hole 31 with respect to the vertical direction. As a result, the upper half of the positioning hole 31 is covered by the reinforcing member 30 in side view, and the lower half is passed through the side portion 21A of the upper left back side frame 21 in an unobstructed manner. As a result, the positioning pin of the manufacturing apparatus can be inserted into the lower part of the positioning hole 31 more deeply than the upper part of the positioning hole 31.

A left pad support bracket 32 is connected to a part of the right side surface of the side portion 21A of the upper left back side flame 21 located below the positioning hole 31 by welding or the like. The left pad support bracket 32 extends laterally under the reinforcing member 30, and protrudes to the right so as to define an upwardly facing surface. A gap is formed between the upwardly facing surface of the left pad support bracket 32 and the lower edge of the reinforcing member 30. A right pad support bracket 33 is connected to the left side surface of the right upper back side frame 13. The right pad support bracket 33 is positioned so as to correspond to the left pad support bracket 32, and protrudes to the left so as to define an upwardly facing surface. An engagement portion of the seat back pad is placed on the upwardly facing surfaces of the left pad support bracket 32 and the right pad support bracket 33.

As shown in FIGS. 6 to 9, the back lower frame 11 is provided with a closed cross section structure, and has a left end portion 11A connected to a lower end part of the upper left back side frame 21, and a right end portion 11B connected to a lower end part of the right upper back side frame 13. The back lower frame 11 of the illustrated embodiment is formed by bending a metal pipe having a circular cross section.

The connecting part between the right end portion 11B of the back lower frame 11 and the right upper back side frame 13 is positioned so as to be offset rearward from the center of the left side surface and the right side surface of the right upper back side frame 13 with respect to the fore and aft direction. The rear edge of the right end portion 11B of the back lower frame 11 is positioned in front of the rear edges of the left side surface and the right side surface of the right upper back side frame 13. The right end portion 11B of the back lower frame 11 is positioned below the upper edge of the lower right back side frame 14 with respect to the vertical direction. A right insertion hole 35 through which the right end portion 11B of the back lower frame 11 is passed is formed in the left side surface and the right side surface of the right upper back side frame 13, and the lower right back side frame 14. The right insertion hole 35 is configured and dimensioned so as to tightly receive the right end portion 11B of the back lower frame 11. The right end portion 11B of the back lower frame 11 is received in the right insertion hole 35, and is welded to the peripheral edge of the right insertion hole 35 of the right upper back side frame 13. The end face of the right end portion 11B of the back lower frame 11 is preferably disposed so as to be substantially flush with the outer side surface of the lower right back side frame 14.

Figure 5:
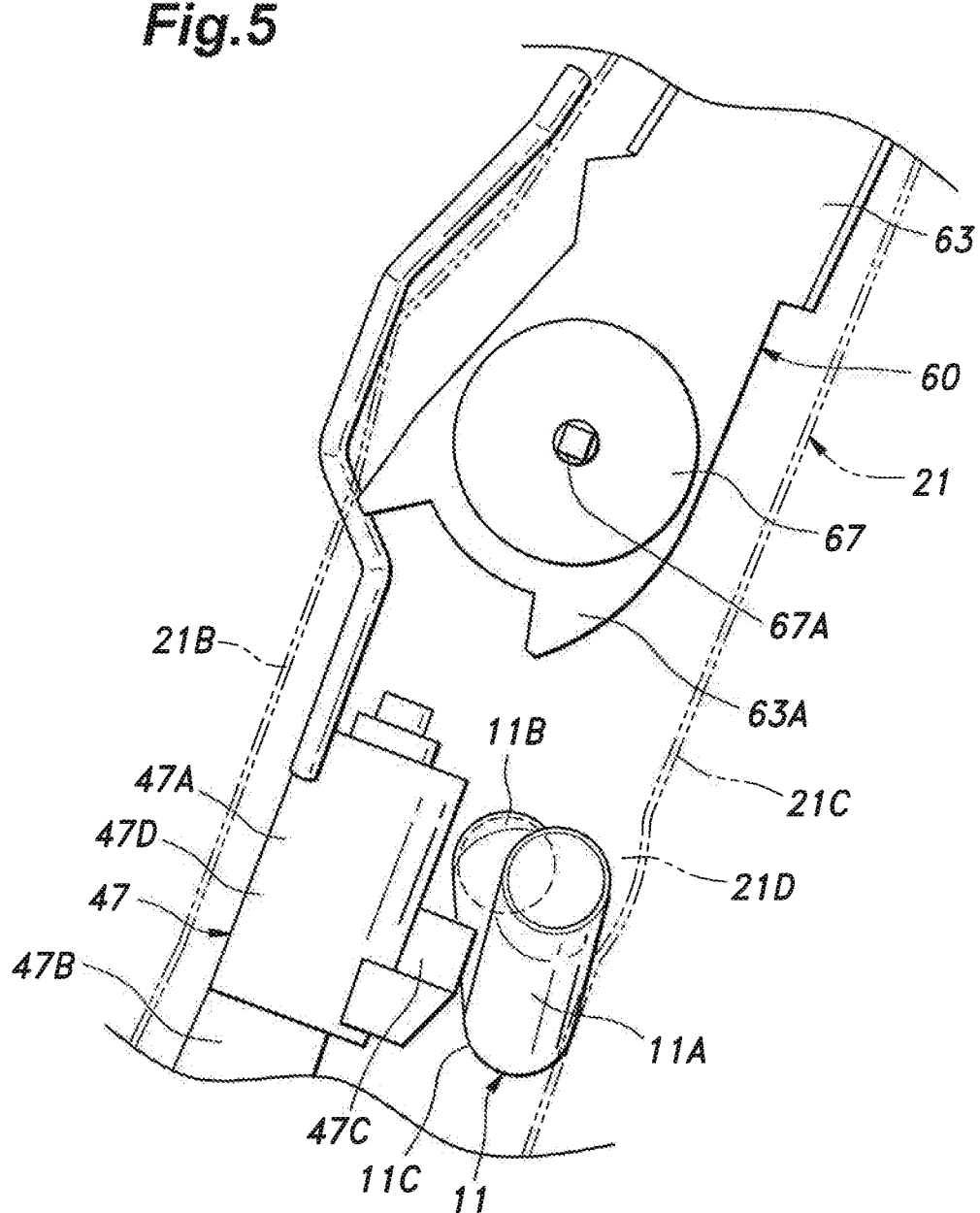
FIG. 5 is a left side view of a lower part of the seat back frame showing a positional relationship between a back lower frame and a drive unit as seen through a left back side frame.

As shown in FIGS. 6 and 7, the side portion 21A of the upper left back side frame 21 is provided with a protruding portion 21D protruding rearward more than the upper and lower parts of the right upper hack side frame 13. The rear edge (outer edge) of the protruding portion 21D is formed in a smooth curved shape, and a flange 21C extends along the rear edge of the protruding portion 21D. The left end portion 11A of the back lower frame 1 is positioned so as to be offset rearward from the center of the side portion 21A with respect to the fore and aft direction. The left end portion 11A of the back lower frame 11 may be positioned such that at least a part thereof overlaps with the protruding portion 21D. In other words, the rear edge of the left end portion 11A of the back lower frame 11 may be positioned more rearward than the rear edge of the upper left back side frame 21, except for the protruding portion 21D. As shown in FIG. 5, the connecting part between the left end portion 11A of the back lower frame 11 and the upper left back side frame 21 is located rearward of the connecting part between the right end portion 11B of the back lower frame 11 and the right upper back side frame 13.

As shown in FIG. 6, a left insertion hole 36 through which the left end portion 11A of the hack lower frame 11 is passed is formed in a side portion 21A of the upper left back side frame 21. It is preferable that the left insertion hole 36 is configured and dimensioned so as to receive the left end portion 11A of the back lower frame 11. A part of the left insertion hole 36 preferably overlaps with the protruding portion 21D, and is positioned so as not to reach the rear edge of the protruding portion 21D. In the lower left back side flame 22, a part corresponding to the left insertion hole 36 is cut out, and the left insertion hole 36 is exposed to the left. The left end portion 11A of the back lower frame 11 is received in the left insertion hole 36, and welded to the periphery of the left insertion hole 36. The end face of the left end portion 11A of the back lower frame 11 is preferably disposed so as to be substantially flush with the outer surface of the lower left back side frame 22.

The central portion 11C of the back lower frame 11 with respect to the lateral direction is disposed rearward and downward from the left end portion 11A and the right end portion 11B thereof. The left end portion 11A and the right end portion 11B of the back lower frame 11 are progressively offset rearward and downward as the back lower frame 11 extends from the respective connecting parts with the upper left back side frame 21 and the right upper back side frame 13 to the laterally central portion 11C of the back lower frame 11. The central portion 11C of the back lower frame 11 extends linearly in the lateral direction. Since the left end portion 11A of the hack lower frame 11 is more rearward offset than the right end portion 11B, the left end portion 11A inclines in the fore and aft direction more than the right end portion 11B. Owing to this configuration, the back lower frame 11 is asymmetric in the laterally outer parts thereof, but symmetrical in the central portion 11C thereof.

As shown in FIG. 9, the left end portion 11A of the back lower frame 11 is connected to the upper left back side frame 21 at the protruding portion 21D, and offset rearward from the center of the upper left back frame 21 with respect to the fore and aft direction. A cavity 37 for accommodating accessory components and devices is defined in a part located inside (left side) of the upper left back side frame 21 and in front of the left end portion 11A of the back lower frame 11. Since the upper left back side frame 21 is channel shaped, and has an opening facing inward, the cavity 37 is formed inside the channel of the upper left back side frame 21.

Figure 8:
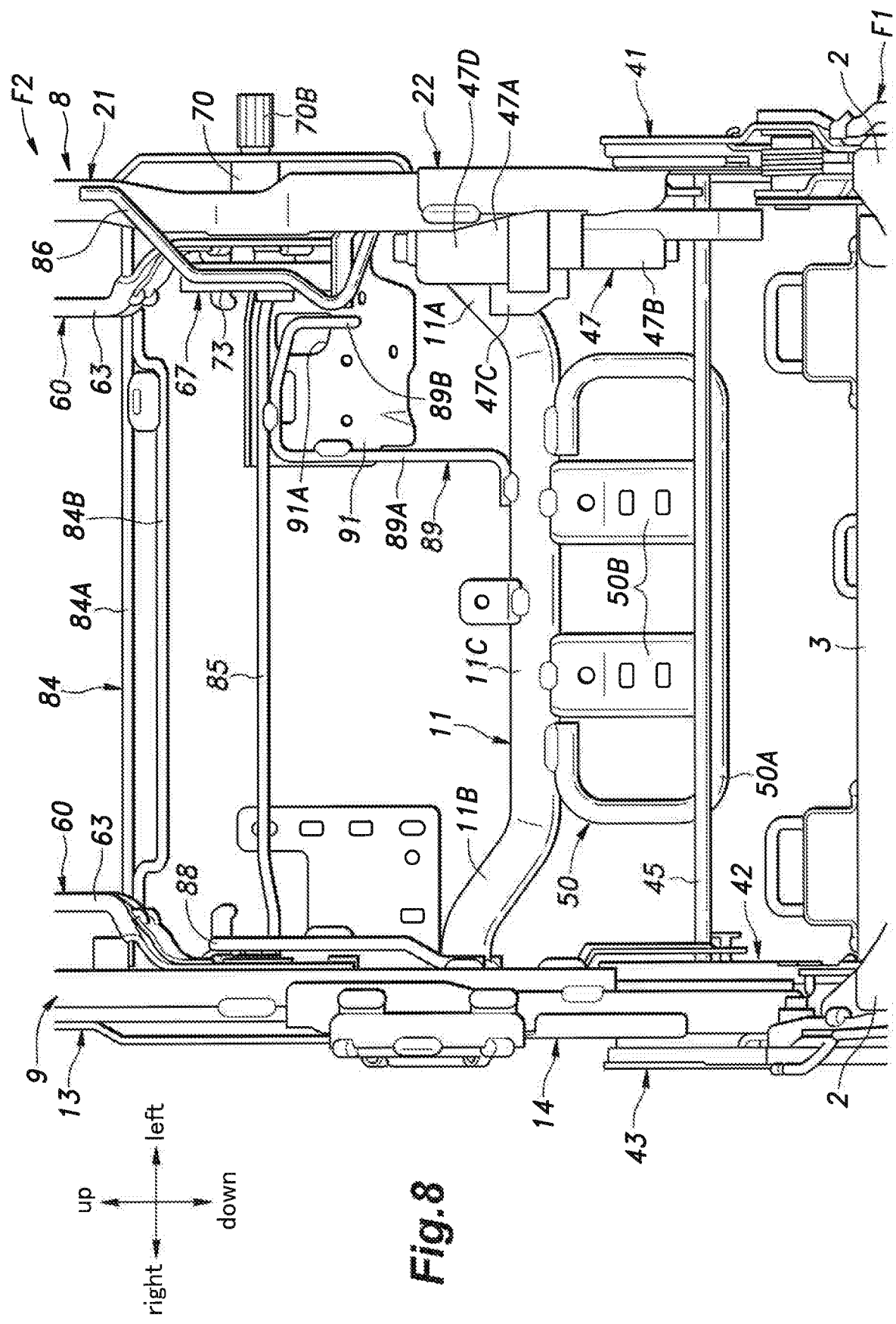
FIG. 8 is a front view of the lower part of the seat back frame.

As shown in FIGS. 6 to 8, a rear part of the left cushion side frame 2 and a lower end part of the left back side frame 8 (the lower left back side frame 22) are connected to each other via a first reclining mechanism 41. The rear part of the right cushion side frame 2 and the lower end part of the right back side frame 9 (the lower right back side frame 14) are connected to each other via a second and a third reclining mechanism 42 and 43. Therefore, the seat back frame F2 can be rotated (tilted) around a laterally extending axial line. Each of the reclining mechanisms 41 to 43 is configured to maintain the tilting (turning) angle of the back side frames 8 and 9 with respect to the cushion side frame 2 at a desired angular position, and may consist of a per se known mechanism. Each of the reclining mechanisms 41 to 43 consists of an electrically driven reclining device that changes the angular position by receiving the rotational torque of an electric motor, and includes a disk-shaped first member (not shown in the drawings) connected to the cushion side frame 2, a second member (not shown in the drawings) which is also disk-shaped, and is connected to the lower right back side frame 14 or the lower left back side frame 22 so as to oppose the first member, and a drive shaft (not shown in the drawings) penetrating the centers of the first and second members, and configured to change the relative angle between the first member and the second member by rotating relative to the first member. In the reclining mechanisms 41 to 43, the angle of the second member with respect to the first member changes in accordance with the rotational angle of the drive shaft.

An example of such reclining mechanisms 41 to 43 will be described in the following. The first member is provided with a first cylindrical portion projecting coaxially with the central axial line of the first member. An external gear is formed on the outer periphery of the first cylindrical portion. The second member is provided with a second cylindrical portion that projects coaxially with the central axial line of the second member, and receives the first cylindrical portion therein. An internal gear is formed on the inner periphery of the second cylindrical portion. The inner diameter of the second cylindrical portion is larger than the outer diameter of the first cylindrical portion, and the number of teeth of the internal gear is one or two more than the number of teeth of the external gear. The first member and the second member are arranged eccentrically from each other so that the external gear and the internal gear mesh with each other on in a part thereof. The second member is provided with a third cylindrical portion coaxially projecting into the second cylindrical portion. The outer diameter of the third cylindrical portion is sufficiently smaller than the inner diameter of the first cylindrical portion so that a gap is defined between the third cylindrical portion and the first cylindrical portion. A bore defined inside the third cylindrical portion extends through the second member, and is exposed to the outside. Similarly, a bore defined inside the first cylindrical portion extends through the first member, and is exposed to the outside. A pair of locking pieces disposed at a distance from each other in the circumferential direction and a spring provided between the locking pieces to urge the locking pieces circumferentially away from each other are disposed in the gap between the inner peripheral surface of the first cylindrical portion and the outer peripheral surface of the third cylindrical portion. A drive shaft that is coaxially rotatable with the third cylindrical portion is received inside the third cylindrical portion. The drive shaft is provided with a drive piece extending radially from a point outside of the projecting end of the third cylindrical portion so as to selectively push one of the lock pieces in the circumferential direction.

In the reclining mechanism configured as described above, in the normal state, the third cylindrical portion is pushed to one side in the first cylindrical portion by the lock pieces urged by the spring so that the meshing position between the external gear and the internal gear is maintained, and the relative angular position between the first member and the second member is maintained. When the drive shaft is rotated, the drive piece pushes one of the lock pieces to one side in the circumferential direction so that the third cylindrical portion pushed by the lock piece moves in the circumferential direction inside the first cylindrical portion. At this time, since the number of teeth of the external gear and that of the internal gear are different, the angle of the second member with respect to the first member changes owing to the movement of the third cylindrical portion in the circumferential direction. In this way, the angle of the second member with respect to the first member changes according to the amount of rotation of the drive shaft.

The drive shafts of the first to third reclining mechanisms 41 to 43 are connected to each other by a connecting shaft 45 extending along a rotational axial line X. An internal bore is passed through in each drive shaft, and the connecting shaft 45 extends through the internal bores of the drive shafts. The connecting shaft 45 and the internal bores of the drive shafts are coupled to each other by serration structures, respectively so that the connecting shaft 45 and the drive shafts are rotationally fast to one another. When the connecting shaft 45 rotates, the drive shafts of the first to third reclining mechanisms 41 to 43 integrally rotate so that the first to third reclining mechanisms R1 to R3 simultaneously change the angular position of the seat hack S2 relative to the seat cushion S1.

As shown in FIGS. 7 to 9, a drive unit 47 for rotating the connecting shaft 45 is provided in the cavity 37 formed on the inner side (the right side) of the left back side frame 8. The drive unit 47 includes an electric motor 47A and a speed reduction mechanism 47B that reduces the rotational speed of the electric motor 47A, and transmits the output torque of the electric motor 47A to the connecting shaft 45. The speed reduction mechanism 47B includes a per se known gear train such as a worm and a worm wheel. The speed reduction mechanism 47B is disposed on the right side of the first reclining mechanism 41 and the lower left hack side frame 22, and the connecting shaft 45 passes through the speed reduction mechanism 47B. The electric motor 47A is provided on the upper side of the speed reduction mechanism 47B such that the rotation axis thereof extends substantially vertically, and is disposed in front of the left end portion 11A of the back lower frame 11. More specifically, the speed reduction mechanism 47B is provided with a flat profile having a smaller lateral dimension as compared to the fore and aft dimension thereof, and the electric motor 47A is provided on the upper front side of the speed reduction mechanism 47B. For example, the axis of the worm wheel included in the speed reduction mechanism 47B extends in the lateral direction, and the worm that is connected to the output shaft of the electric motor 47A and meshes with the worm wheel is disposed in front of the worm wheel.

The electric motor 47A is provided with a connector 47C to which a wire harness for the electric motor 47A is connected. The connector 47C is disposed on a part of the outer surface of a motor housing 47D that faces the left end portion 11A of the back lower frame 11. In other words, the connector 47C is provided at a rear part of the motor housing 47D, and is disposed between the motor housing 47D and the right end portion 11B of the hack lower frame 11. Further, the connector 47C is arranged so that the connecting part faces upward.

An intermediate part of the wire harness for the electric motor 47A is supported by a harness support member 49 provided at the left end portion 11A of the back lower frame 11. The harness support member 49 may, for example, be provided with a plate piece welded to the back lower frame 11, and the wire harness is secured to the plate piece with a fastening band or the like.

As shown in FIGS. 6 to 9, a central portion 11C of the back lower frame 11 is provided with an auxiliary frame 50 that protrudes downward. The auxiliary frame 50 includes a frame portion 50A formed as a substantially rectangular frame and a pair of reinforcing portions 50B extending across the frame portion 50A. The frame portion 50A is formed by bending a metal pipe, and forms a rectangular frame shape in cooperation with the central portion 11C of the back lower frame 11. The frame portion 50A is disposed such that the long side of the substantially rectangular shape is the lower edge, and is connected to the central portion 11C of the back lower frame 11 by welding or the like in the upper part thereof. The reinforcing portions 50B are formed of sheet metal members, and arranged vertically across the frame portion 50A. The upper end part of each reinforcing portion 50B is welded to the central portion 11C of the back lower frame 11, and the lower end part thereof is welded to the lower end of the frame portion 50A.

The auxiliary frame 50 is positioned behind the connecting shaft 45, and the lower end part thereof is positioned below the connecting shaft 45. Further, the auxiliary frame 50 is inclined with respect to the fore and aft direction so that the lower end part thereof is positioned in front of the upper end part thereof. The lower end part of the auxiliary frame 50 constitutes the lower edge of the seat back.

As shown in FIG. 2, the movable frame F3 is provided with a pair of side frames 60, and an upper frame 61 joining the upper end parts of the left and right side frames 60 to each other. The side frames 60 each include an upper side frame 62 and a lower side frame 63 which are made of sheet metal members, and the side frames 60 are formed symmetrically to each other.

The upper side frame 62 is provided with a side portion 62A extending vertically and having a laterally facing major plane, and an upper portion 62B having a major plane facing in the fore and aft direction and connected to an upper end part of the side portion 62A via a connecting part that smoothly curves laterally inward. The side portion 62A is bent at a vertically intermediate part thereof in such a manner that an upper part thereof is offset laterally inward from a lower part thereof. Flanges 62C and 62D that project laterally inward are provided on the front edge and the rear edge of the side portion 62A, respectively, and extend along these edges. The flange 62C extending along the front edge of the side portion 62A is continuously connected to the upper edge of the upper portion 62B at the upper end of the side portion 62A, and then extends along the upper edge. A reinforcing wall 62E protruding laterally inward is formed on the rear edge of the upper half part of the side portion 62A. The reinforcing wall 62E, is continuously connected to the upper portion 62B, and connects the side portion 62A and the upper portion 62B to each other at a corner. The side portion 62A, the upper portion 62B, the flange 62C and the reinforcing wall 62E are integrally formed by bending a single piece of sheet metal.

The upper frame 61 extends laterally, and the lateral ends of the upper frame 61 oppose the upper portions 62B of the respective upper side frames 62. The lateral ends of the upper frame 61 are smoothly curved forward and downward, and extend along the inner surfaces of the side portions 62A of the respective upper side frames 62. The upper frame 61 is connected to the upper portions 62B and the side portions 62A of the respective upper side frames 62 by welding or the like. The upper frame 61 is made of a sheet metal member formed as a channel member, and is disposed such that the open side of the channel member opposes the upper portions 62B and the side portions 62A. Thereby, the upper flame 61 forms a closed section structure in cooperation with the upper portions 62B and the side portions 62A. A connecting pipe 65 is connected between lower parts of the left and right side portions 62A.

As shown in FIGS. 2, 7, and 8, the lower side flame 63 is made of a sheet metal member. The lower side frame 63 extends vertically, and has a laterally facing major plane. The upper end part of the lower side frame 63 is connected to the laterally facing outer surface of the side portion 62A of the upper side frame 62 by threaded bolts or the like. The lower side frame 63 is bent at a vertically intermediate part thereof in such a manner that the lower end part thereof is offset outward from the upper end part thereof. Further, the lower end part of the lower side frame 63 is provided with a larger fore and aft dimension than an upper part thereof so as to form a pivot support portion 63A (pivotally mounting portion) that is configured to be attached to the back side frame 8, 9 so as to be pivotable (tiltable) around a laterally extending rotational center line.

The pivot support portion 63A of the right lower side frame 63 is rotatably connected to the right upper back side frame 13 (right back side frame 9). The pivot support portion 63A of the left lower side frame 63 is rotatably connected to the upper left back side frame 21 (left back side frame 8) via a fourth reclining mechanism 67. The lower side frames 63 have a common rotational center line which is positioned vertically between the pad support brackets 32 and 33 and the back lower frame 11.

The fourth reclining mechanism 67 includes a first member connected to the upper left back side frame 21, a second member connected to the pivot support portion 63A of the lower side frame 63, and a drive shaft 67A provided between the first member and the second member and configured to selectively connect and disconnect the first member and the second member to and away from each other by rotating. The fourth reclining mechanism 67 may consist of a per se known manual reclining mechanism. For instance, the fourth reclining mechanism 67 is configured such that the first member and the second member are arranged coaxially, and the drive shaft 67A passes through the rotational center of the first member and the second member. Further, the fourth reclining mechanism 67 includes a cam plate connected in a rotationally fast manner to the drive shaft 67A and disposed in an internal space defined between the first member and the second member, a plurality of lock members positioned in the internal space, and a biasing member such as a torsion spring for biasing the cam plate in a rotational direction. The lock members engage with a guide groove formed in the first member, and are disposed so as to be movable in the radial direction of the first member. Each lock member is provided with a cam portion on a radially inner part thereof, and external teeth along the outer periphery thereof so as to mesh with internal teeth formed along the inner periphery of the second member that defines the internal space when the lock member is displaced in a radially outward direction. The cam plate is configured to engage with the lock member so as to move the lock member radially outward when the cam plate rotates in one rotational direction and move the lock member radially inward when the earn plate rotates in the other rotational direction. In the fourth reclining mechanism 67 configured as described above, in a normal state, the drive shaft is biased by the biasing member to be in the locked position wherein the lock members are engaged with the second member and the first member and the second member are angularly locked to each other. On the other hand, when the drive shaft is rotated against the biasing three of the biasing member, and is thus placed in an unlocked position, the lock members are released from the second member, and the first member and the second member are in a released position or enabled to rotate relative to each other.

As shown in FIG. 6, the side portion 21A of the upper left back side frame 21 is provided with a bulging portion 21E bulging laterally inward at a part thereof facing the fourth reclining mechanism 67. The bulging portion 21E bulges to a substantially same extent as the height of the flanges 21B and 21C, and the projecting end of the bulging portion 21E is formed as a planar surface that faces laterally inward. The back side of the bulging portion 21E is recessed in a manner corresponding to the shape of the bulging portion 21E. The left lower side frame 63 is disposed outside of the channel of the upper left back side frame 21 owing to the presence of the bulging portion 21E. Thereby, the movable frame F3 can be tilted back and forth without interfering with the flanges 21B and 21C of the upper left back side frame 21.

As shown in FIGS. 2 and 6, the drive shaft 67A of the fourth reclining mechanism 67 passes through the bulging portion 21E and protrudes out of the side portion 21A in the lateral direction. An extension shaft 70 is connected to a free end of the drive shaft 67A. The inner end of the extension shaft 70 is formed with a connecting hole 70A configured to receive the free end of the drive shaft 67A in rotationally fast manner. The free end of the drive shaft 67A is formed in a prismatic shape having a rectangular, square or other cross sectional shape, and the connecting hole 70A is provided with a cross sectional shape complementary to the free end of the drive shaft 67A. The extension shaft 70 extends coaxially with the drive shaft 67A, and extends in the laterally outward direction. An outer end of the extension shaft 70 is connected to an operation lever 71. The operation lever 71 is formed with a connecting hole 71A into which the outer end of the extension shaft 70 can be inserted. The outer peripheral surface of the outer end of the extension shaft 70 and the inner peripheral surface of the connecting hole 70A of the operation lever 71 are formed with serrations 70B and 71B, respectively, which are configured to engage with each other. The operation lever 71 is thus connected to the drive shaft 67A via the extension shaft 70, and rotates integrally with the drive shaft 67A. As a result, by manually operating the operation lever 71, the fourth reclining mechanism 67 can be switched between the locked state and the released state.

As shown in FIG. 7, a spiral torsion spring 73 is provided on the laterally inner side of the pivot support portion 63A of the left side lower side frame 63 as a biasing member. The spiral torsion spring 73 is disposed coaxially with the pivotal axis of the movable frame F3. One end of the spiral torsion spring 73 is connected to the lower side frame 63 on the left side, and the other end thereof is connected to the upper left back side frame 21. The spiral torsion spring 73 urges the movable frame F3 in a direction to tilt forward the movable frame F3 with respect to the seat back frame F2. As shown in FIG. 2, a pair of headrest attachment portions 75 for supporting the headrest are connected to the upper frame 61. Each headrest attachment portion 75 is tubular, and receives a tubular insert (not shown) made of resin therein. The headrest has a pair of headrest pillars (not shown), and is attached to the upper frame 61 by inserting the headrest pillars into the headrest attachment portions 75 via the inserts, respectively.

Each side frame 60 including the upper side frame 62 and the lower side frame 63 is provided with at least one first weakened portion 77. The first weakened portion 77 locally reduces the stiffness of a part of the side frame 60 so as to create a starting point of deformation when an external load is applied. For example, the first weakened portion 77 may consist of a cutout or a notch extending to a side edge of the member, a through hole formed in the member, perforations arranged continuously at a predetermined interval, or a thin-walled portion in which the wall thickness of the member is locally reduced.

It is preferable that the first weakened portion 77 is disposed between the headrest attachment portion 75 and the pivot support portion 63A in the side frame 60 on each side of the seat. In the present embodiment, the first weakened portion 77 is disposed in a part of the upper side frame 62 located below the lower end of the upper frame 61, and above the upper end of the lower side frame 63. In addition, the first weakened portion 77 is disposed above the connecting part between the upper side frame 62 and the connecting pipe 65. The left and right first weakened portions 77 are arranged at a same vertical position.

In addition, the first weakened portion 77 is disposed at a position corresponding to the reinforcing wall 62E in the vertical direction. The reinforcing wall 62E is provided with a second weakened portion 78 at a part thereof corresponding to the first weakened portion 77. The second weakened portion 78 may have the same configuration as the first weakened portion 77 described above. Thus, when deformation occurs from the first weakened portion 77 owing to an external load, the second weakened portion 78 also deforms so that the capability of the reinforcing wall 62E to inhibit the deformation of the upper side frame 62 is suppressed.

In the present embodiment, the first weakened portion 77 consists of a cutout formed in each of the upper side frames 62, and extends so as to reach the side portion 62A from the protruding end of the flange 62C of the front edge. Further, the second weakened portions 78 are each formed as a cutout in the corresponding reinforcing wall 62E, and each extend upward from the lower edge of the reinforcing wall 62E vertically beyond the corresponding first weakened portion 77. Each second weakened portion 78 is preferably arranged as close as possible to the side portion 62A of the corresponding upper side frame 62 with respect to the lateral direction. Owing to the presence of the second weakened portion 78, the lower part of the reinforcing wall 62E does not affect the stiffness of the upper side flame 62.

The lower part of the reinforcing wall 62E constitutes a harness supporting portion 62F for supporting a wire harness. The harness supporting portion 62F includes a through hole penetrating the lower part of the reinforcing wall 62E in the thickness direction. The wire harness is fastened to the harness supporting portion 62F by using a fastening band or the like. The wire harness supported by the harness supporting portion 62F is connected to a device such as a heater, for example, arranged in an upper part of the seat back supported by the movable frame F3.

A plurality of pad support members 81 to 86 for supporting the seat back pad are provided at appropriate positions of the movable frame F3, and the back side frames 8 and 9. The first pad support members 81 is provided on each of the upper side frames 62. The first pad support members 81 are each formed by bending a rod member, and each have an upper end welded to a part of the upper side frame 62 located above the first weakened portion 77 and a lower end welded to a part of the upper side frame 62 located below the first weakened portion 77. An intermediate part of each first pad support member 81 with respect to the lengthwise direction thereof protrudes forward and laterally outward with respect to the upper side frame 62. Each first pad support member 81 is preferably provided with a sufficiently low stiffness in comparison with the upper side frame 62 having the first weakened portion 77 so as not to inhibit the deformation of the upper side frame 62 originating from the first weakened portion 77. The first pad support members 81 are each provided with a plurality of bent portions which serve as starting points of deformation so as to demonstrate a limited stiffness.

The second pad support member 82 is located between the upper frame 61 and the connecting pipe 65, and extends between the left and right upper side frames 62. The third pad support member 83 extends in the lateral direction, and has two ends that are connected to the respective ends of the connecting pipe 65. An intermediate part of the third pad support member 83 protrudes downward relative to the connecting pipe 65.

The fourth pad support member 84 includes a first rod member 84A extending between the left and right pad support brackets 32 and 33, and a second rod member 84B extending laterally and having two ends thereof connected to respective end parts of the first rod member 84A. An intermediate part of the second rod member 84B protrudes downward and forward relative to the first rod member 84A.

The fifth pad support member 85 is formed of a laterally extending rod member, and has a right end connected to the rear surface of the right upper back side frame 13 and a left end connected to the rear surface of the upper left hack side frame 21. The left and right ends of the fifth pad support member 85 are disposed behind the respective pivot support portions 63A of the movable flame F3. A laterally intermediate part of the fifth pad support member 85 protrudes forward relative to the two end parts thereof.

The sixth pad support member 86 is formed of a vertically extending rod member, and has an upper end and a lower end welded to the flange 21B provided on the front edge of an upper left side frame. The upper end of the sixth pad support member 86 is disposed above the pivot support portion 63A with respect to the vertical direction, and the lower end of the sixth pad support member 86 is disposed below the pivot support portion 63A. An intermediate part of the sixth pad support member 86 protrudes to the right relative to the upper left side frame and is arranged so as to cover the front side of the spiral torsion spring 73.

On the left side surface of the right upper hack side frame 13 is provided a protection member 88 for protecting the right side pivot support portion 63A of the movable frame F3. The protection member 88 has a lower end welded to a lower side part of the left side surface of the right upper hack side frame 13, and an upper end extending to the left side of the pivot support portion 63A and terminating at a free end thereof. In the present embodiment, the protection member 88 is formed by bending a rod member such that the two ends thereof form the lower end thereof, and an intermediate part thereof forms the upper end thereof.

As shown in FIGS. 2, 8, and 9, the back lower frame 11 and the fifth pad support member 85 are connected to each other by a connecting member 89 which is formed by bending a rod member. The connecting member 89 has one end welded to the central portion 11C of the back lower frame 11, a connecting portion 89A extending vertically from the one end of the connecting member 89 to the fifth pad support member 85, and a limiting portion 89B extending leftward and forward from the upper end of the connecting portion 89A and then bent downward. A part of the connecting member 89 located between the connecting portion 89A and the limiting portion 89B is welded to the fifth pad support member 85. The limiting portion 89B is disposed on the right side of the spiral torsion spring 73 to limit interferences to the spiral torsion spring 73 and the pivot support portion 63A of the movable frame F3 by other component parts.

As shown in FIG. 2 and FIGS. 7 to 9, a bracket 91 is connected to a part of the flange 21C provided on the rear edge of the upper left back side frame 21 located below the connecting part thereof at which the fifth pad support member 85 is connected. The bracket 91 is made of a sheet metal member, and extends rightward along the fifth pad support member 85. The upper edge of the bracket 91 is bent forward and is engaged by the fifth pad support member 85. Further, the bracket 91 is disposed behind the connecting member 89, and the right end thereof extends to a position corresponding to the connecting portion 89A of the connecting member 89 to be welded to the connecting portion 89A. The bracket 91 thus covers the pivot support portion 63A of the movable frame F3 and the rear part of the spiral torsion spring 73 so as to limit interferences to the pivot support portion 63A of the movable frame F3 and the spiral torsion spring 73 by other component parts.

A guide hole 91A is passed through the bracket 91 in the fore and aft direction. A wire harness extending into an upper part of the seat back constituted by the movable frame F3 passes through the guide hole 91A from the rear side to the front side, and thereafter is passed around the right side of the limiting portion 89B of the connecting member 89. As a result, the wire harness is restricted from approaching the pivot support portion 63A and the spiral torsion spring 73 of the movable frame F3 owing to the presence of the bracket 91 and the connecting member 89.

Hereinafter, various features and advantages of the seat S configured as described above will be described. Since the upper part of the left back side frame 8 and the reinforcing member 30 cooperate with each other to form a closed cross section structure for the seat S, the stiffness of the left back side frame 8 is increased, and deformation thereof is suppressed. As a result, the external load that may be applied to the upper part of the seat back frame F2 is efficiently transmitted from the back upper frame 10 to the seat cushion frame F1 via the back side frames 8 and 9 and the first to third reclining mechanisms 41-43. In addition, since the lower part of the left back side frame 8 has an open cross section structure, the left back side frame 8 can be made as a thin and compact structure. In addition, other component parts and devices such as the drive unit 47 including the electric motor 47A can be positioned inside the left back side frame 8.

Since the back upper frame 10 and the left back side frame 8 are smoothly connected to each other via the curved portion 23, stress concentration on the connecting part between the back upper frame 10 and the left back side frame 8 is suppressed. Further, since the curved portion 23 is reinforced by the reinforcing member 30, deformation of the connecting part between the back upper frame 10 and the left back side frame 8 is suppressed even further.

Since the curved portion 23 is formed in the upper left backside frame 21, the second moment of inertia (stiffness) of the upper left back side frame 21 consisting of a sheet metal member is increased by the three-dimensional structure of the curved portion 23, in addition, since the cross section of the curved portion 23 is channel shaped, and the reinforcing member 30 is fitted in the channel of the curved portion 23 so as to form a closed cross section jointly with the curved portion 23, the combined stiffness of the reinforcing member 30 and the curved portion 23 is enhanced by this closed cross section structure.

Since the connecting part between the back upper frame 10 and the upper left back side frame 21 and the connecting part between the back upper frame 10 and the reinforcing member 30 are laterally offset from each other, the left end of the back upper frame 10 and the upper end of the upper left back side frame 21 to which the reinforcing member 30 is connected are caused to engage with each other so that the stiffness of the connecting part between the back upper frame 10 and the upper left back side frame 21 is increased.

Since the upper left back side frame 21 is provided with a channel shape opening out toward the inner side from the lateral direction (right side), the upper left back side frame 21 internally defines a cavity 37 that receives other component parts such as the drive unit 47 including the electric motor 47A and so on. As a result, the component parts are protected by the upper left hack side frame 21 from an external loading.

Since the lower end of the reinforcing member 30 extends to a position opposing the positioning hole 31, a part of the upper left back side frame 21 where the stiffness thereof is reduced by the positioning hole 31 is reinforced by the reinforcing member 30.

The lower end of the reinforcing member 30 is arranged above the pad support bracket 32 with a space defined therebetween, and the space defined between the pad support bracket 32 and the reinforcing member 30 creates a space around the pad support bracket 32. This allows the seat back pad to be positioned around the pad support bracket 32, and increases the area over which the pad support bracket 32 and the seat back pad are engaged with each other.

Since the pivot support portion 63A of the movable frame F3 is disposed within the open cross section structure of the upper left back side frame 21, the movable frame F3 and the upper left back side frame 21 can be arranged efficiently.

Since the sixth pad support member 86 for restricting the movement of the seat back pad is disposed so as to surround the pivot support portion 63A of the movable frame F3, contact between the seat back pad and the pivot support portion 63A can be avoided.

Since the two reclining mechanisms 42 and 43 are provided at the connecting part between the right back side frame 9 and the seat cushion frame F1, the stiffness of the connecting part between the right back side frame 9 and the seat cushion frame F1 is enhanced. As a result, the external load that may be applied to the seat hack frame F2 is mainly transmitted to the seat cushion frame F1 via the right back side frame 9 and the second and third reclining mechanisms 42 and 43 so that deformation of the upper left back side frame 21 is minimized.

Since the belt guide 16 is provided at the upper end of the right back side flame 9, an external load that may be applied to the seat back frame F2 via the seat belt and the belt guide 16 is mainly transmitted to the seat cushion frame F1 via the right back side frame 9 and the second and third reclining mechanisms 42 and 43.

Since the left end portion 11A of the back lower frame 11 is offset rearwardly with respect to the right end portion 11B, the cavity 37 is formed in front of the left end portion 11A and inside the lower part of the upper left back side frame 21. In other words, the right upper back side frame 13 and the upper left hack side frame 21 can be attached to the back lower frame 11 without interfering with the cavity 37 in which other component parts such as the electric motor 47A is disposed.

Since the left end portion 11A of the back lower frame 11 is offset away from the hack part of the occupant seated on the seat S, it is possible to prevent the occupant sitting on the seat S from experiencing discomfort. Further, by providing the protruding portion 21D, it is possible to maximize the rearward offset of the left end portion 11A of the back lower frame 11. Further, at least a part of the left end portion 11A of the back lower frame 11 is connected to the protruding portion 21D so that the offset of the left end portion 11A of the back lower frame 11 toward the rear is further increased.

In the back lower frame 11 since the central portion 11C corresponding to the back part of the occupant is formed in a symmetrical shape, the occupant is prevented from experiencing any discomfort. In addition, since the central portion 11C of the back lower frame 11 is disposed below and to the rear of the left end portion 11A and the right end portion 11B, a distance is secured between the back lower frame 11 and the back part of the occupant so that the occupant is prevented from experiencing discomfort.

By disposing the electric motor 47A in the cavity 37 formed inside the upper left back side frame 21, the electric motor 47A can be accommodated in the seat back in a space efficient manner by utilizing the open cross section structure of the upper left back side frame 21. Further, since the electric motor 47A is disposed inside the upper left back side flame 21, the electric motor 47A is protected from external forces. Further, since the connector 47C is disposed between the housing and the back lower frame 11, the connector 47C is protected from external forces.

Since the wire harness connected to the electric motor 47A is supported on the left end portion 11A of the back lower frame 11 close to the connector 47C, the wire harness is protected from vibrations.

Since the auxiliary frame 50 provided on the back lower frame 11 is disposed below the drive shafts and the connecting shaft 45 of the first to third reclining mechanisms 41 to 43, the lower end part of the seat back enabled to maintain the shape thereof owing to the presence of the auxiliary frame 50. In the automobile manufacturing line, in order to transport the seat S, the lower end portion of the seat back may be supported by a hanger device. In this case, since the auxiliary frame 50 is present at the lower end part of the seat back, the weight of the seat S can be supported by the hanger device via the auxiliary frame 50 so that deformation of the seat back is prevented. Further, since the load applied to the seat hack from the lower side is applied to the auxiliary frame 50 and prevented from being applied to the drive shafts and the connecting shaft 45, the deformation of the drive shafts and the connecting shaft 45 is prevented.

Since the auxiliary frame 50 is disposed behind the drive shafts and the connecting shaft 45, and in particular at a position away from the occupant, the occupant is prevented from experiencing discomfort.

The connecting member 89 protruding upwardly is provided on the back lower frame 11, and the limiting portion 89B of the connecting member 89 prevents the swinging movement of the wire harness extending to the upper part of the seat back constituted by the movable frame F3 so that the wire harness is prevented from coming undesirably close to the pivot support portion 63A, the spiral torsion spring 73, and the fourth reclining mechanism.

Since the movable frame F3 is provided with the first weakened portion 77, when an external load exceeding a predetermined level is applied to the movable frame F3 of the headrest connected to the movable frame F3, the movable frame F3 is deformed with the first weakened portion 77 acting as a starting point so that the impact is favorably absorbed. For example, when the occupant of the seat S or the occupant of the seat disposed behind the seat S collides with the upper part of the seat back constituted by the movable frame F3 or the headrest in case of a vehicle crash or the like, the movable frame F3 deforms from the first weakened portion 77 so as to absorb the impact of the crash, and the impact applied to the occupant is thereby reduced.

Since the first weakened portion 77 is provided between the headrest attachment portions 75 and the pivot support portions 63A, when an external load is applied to the headrest, the movable flame F3 is bent in a reliable manner with the first weakened portion 77 acting as a starting point of the deformation.

Since the first weakened portion 77 is formed on the front edge of the side frame 60 of the movable frame F3, when an external load is applied to the movable frame F3 from behind, the resulting impact can be absorbed in a favorable manner because the movable frame F3 bends forward. Thereby, when the occupant of the seat disposed behind the seat S collides with the upper part of the seat back constituted by the movable frame F3 or the headrest, the impact applied to the occupant is favorably reduced.

The stiffness of the side frame 60 of the movable frame F3 is enhanced by the presence of the flange 62C. On the other hand, since the first weakened portion 77 is formed by extending the cutout from the flange 62C to the side portion 62A, a difference in stiffness between the first weakened portion 77 and the remaining portion of the side frame 60 is maximized with the result that the movable frame F3 is caused to bend from the first weakened portion 77 acting as a starting point of deformation in a reliable manner.

The stiffness of the connecting part between the side frame 60 and the upper frame 61 is enhanced by the reinforcing wall 62E. Since the reinforcing wall 62E has the second weakened portion 78 at a position corresponding to the first weakened portion 77 with respect to the vertical direction, the side frame 60 is enabled to deform starting from the first weakened portion 77 without being hindered by the reinforcing wall 62E. Since the second weakened portion 78 extends upward from the lower edge of the reinforcing wall 62E in the vertical direction beyond the first weakened portion 77, and corresponds to the first weakened portion 77 over a wide range, the deformation of the frame F3 starting from the first weakened portion 77 is effected without being obstructed by the reinforcing wall 62E. In addition, since the harness supporting portion 62F is provided on the reinforcing wall 62E, the oscillation of the wire harness disposed on the upper portion of the seat back is minimized.

Since the connecting pipe 65 extends between the left and right side frames 60 of the movable frame F3, and the first weakened portion 77 is provided above the connecting pipe 65, the lower side of the side frame 60, in particular the part thereof connected to the seat back frame F2, is increased in stiffness by the connecting pipe 65. In addition, since the stiffness of the first weakened portion 77 is significantly reduced as compared to the lower part of the side frame 60, an external load can cause a deformation starting from the first weakened portion 77 in an even more reliable manner.

The first pad support member 81 is connected to the side frame 60 so as to straddle the first weakened portion 77. However, since the first pad support member 81 has a bent portion that can act as a starting point of deformation, the deformation of the side frame 60 from the first weakened portion 77 as a starting point can be initiated without being hindered.

By providing the extension shaft 70, the operation lever 71 can be positioned outside of the seat back frame F2 away from the drive shaft 67A of the fourth reclining mechanism 67. As a result, even when the upper left back side frame 21 is covered with the covering material such as the seat back pad, the operation lever 71 is positioned outside of the covering material, and can be therefore manually operated. Since the extension shaft 70 and the operation lever 71 are connected to each other by the serrations 70B and 71B, the operation lever 71 and the extension shaft 70 are so firmly connected to each other that the rotation of the operation lever 71 can be transmitted to the extension shaft 70 in a reliable manner.

Although the present invention has been described in terms of a concrete embodiment, the present invention is not limited to the above-described embodiment, but can be widely modified. For example, welding is selected as a means for joining the respective members, but any other per se known joining means such as rivets, friction stir welding and adhesive joining may also be used instead of welding. The above-described seat S may also be configured as a mirror image of what was described above.

The curved portion 23 integrally formed with the upper left back side frame 21 may be formed integrally with the back upper frame 10, instead of the upper left hack side frame 21. The left end portion of the front side member 26 of the hack upper frame 10 may be positioned to the right of the left end portion of the rear side member 27 so that the end of the reinforcing member 30 may be fitted into the front part of the rear side member 27.

In the above embodiment, the left end portion 11A of the back lower frame 11 is offset rearward relative to the right end portion 11B. However, in an alternate embodiment, the left end portion 11A may be offset in any direction such as upward, downward or forward relative to the right end portion 11B. The cavity 37 may be formed on the side opposite to the offsetting direction of the left end portion 11A. Further, the cavity 37 may accommodate other devices, component parts, etc., instead of or in addition to the drive unit 47.

Further, in the above described embodiment, the central portion 11C of the back lower frame 11 extends linearly in the lateral direction, but in an alternate embodiment, the central portion 11C may have a different shape such as an arcuate shape protruding rearward.

In the above described embodiment, the auxiliary frame 50 has a substantially rectangular contour, but in an alternate embodiment, the auxiliary frame 50 may have any other contour. In such a case, the lower edge of the auxiliary flame 50 may be located below the connecting shaft 45.

In the above described embodiment, the first weakened portion 77 is provided on the front edge of the upper side frame 62, but in an alternate embodiment, the first weakened portion 77 may be provided on the rear edge of the upper side frame 62. In this case, the movable frame F3 deforms rearward when subjected to a loading from the front so as to favorably absorb the impact.

In the above described embodiment, the connecting structure between the extension shaft 70 and the operation lever 71 consists of the serrations 70B and 71B, but other known connecting structures may also be used.

In the above embodiment, the present invention was applied to a seat for a land vehicle, but the seat according to the present invention can also be applied to various types of seats for aircraft, railway, and the like. In addition, all the constituent elements of the seat S shown in the above embodiment are not necessarily indispensable, and can be omitted or substituted as appropriate.

Glossary of Terms 8 left back side frame
9 right hack side frame
10 back upper frame
11 back lower frame
13 right upper hack side frame
14 right lower back side frame
16 belt guide
21 upper left back side frame
21D protruding portion
22 left lower back side frame
23 curved portion
31 positioning hole
32 left pad support bracket
37 cavity
41 first reclining mechanism
42 second reclining mechanism
43 third reclining mechanism
45 connecting shaft
47 drive unit
47A electric motor
47C connector
47D motor housing
49 harness supporting member
50 auxiliary frame
60 side frame
61 upper frame
62 upper side frame
62E reinforcing wall
62F harness supporting portion
63 lower side frame
65 connecting pipe
67 fourth reclining mechanism
67A drive shaft
70 extension shaft
71 operation lever
77 first weakened portion
78 second weakened portion
81 first pad support member
85 fifth pad support member
86 sixth pad support member
88 protective member
89 connecting member
89A connecting portion
89B limiting portion
91 bracket
91A guide hole F1 seat cushion frame
F2 seat back frame
F3 movable frame
S seat

The invention claimed is:

1. A vehicle seat, comprising:
a seat back frame; and
a movable frame provided at a position corresponding to an upper back portion of an occupant and having a pivot support portion connected to the seat back frame via a reclining mechanism so as to be tiltable around a laterally extending rotational axial line,
wherein the movable frame is provided with a first weakened portion configured to be a starting point of deformation when an external load exceeding a prescribed value is applied to the movable frame.

2. The vehicle seat according to claim 1, wherein the movable frame is provided with a headrest mounting portion for mounting a headrest thereto, and the first weakened portion is provided between the headrest mounting portion and the pivot support portion.

3. The vehicle seat according to claim 1, wherein the movable frame includes a pair of side frames tiltably connected to the seat back frame, and an upper frame extending between upper parts of the respective side frames, the side frames being made of plate members and the first weakened portion including a notch formed in a front edge of each side frame.

4. The vehicle seat according to claim 3, wherein each side frame includes a side portion having a laterally facing major plane and extending vertically, and a flange projecting from a front edge of the side portion, the notch extending from a free end of the flange to a part of the side portion.

5. The vehicle seat according to claim 3, wherein each side frame includes a side portion having a laterally facing major plane and extending vertically, and a reinforcing wall extending from a rear edge of the side portion and connected to a part of the upper frame, the first weakened portion being positioned so as to vertically align with the reinforcing wall, and the reinforcing wall being provided with a second weakened portion positioned so as to vertically align with the first weakened portion.

6. The vehicle seat according to claim 5, wherein the second weakened portion extends from a lower edge of the reinforcing wall upward beyond the first weakened portion with respect to a vertical direction.

7. The vehicle seat according to claim 5, wherein the reinforcing wall is provided with a harness support portion configured to support a wire harness.

8. The vehicle seat according to claim 3, wherein the movable frame is provided with a connecting member extending between lengthwise intermediate parts of the respective side frames, and
the first weakened portion is provided above the connecting member.

9. The vehicle seat according to claim 3, wherein the movable frame is provided with a pad support member having one end connected to a part of one of the side frames located above the first weakened portion thereof, and another end connected to a part of the side frame located below the first weakened portion thereof, the pad support member being provided with at least one bent portion.

10. The vehicle seat according to claim 1, wherein the reclining mechanism includes a first member connected to the seat back frame, a second member connected to the movable frame, a drive shaft provided between the first member and the second member, and configured to selectively connect and disconnect the first member and the second member to and from each other via an angular movement thereof, an extension shaft engaged to the drive shaft so as to coaxially and integrally rotate with the drive shaft, and extending laterally outward from the seat back frame, and an operation lever engaged to a free end of the extension shaft so as to integrally rotate with the extension shaft.

11. The vehicle seat according to claim 10, wherein the operation lever is provided with a receiving hole configured to receive the free end of the extension shaft, and an outer circumference of the free end of the extension shaft and an inner circumference of the receiving hole are engaged with each other by serration structures.

* * * * *